United States Patent [19]

Benson et al.

[11] Patent Number: 5,291,655
[45] Date of Patent: Mar. 8, 1994

[54] METHOD OF MAKING A ONE-PIECE BALL BEARING RETAINER

[75] Inventors: Jeffrey P. Benson; Richard L. Alling, both of Torrington, Conn.

[73] Assignee: The Torrington Company, Torrington, Conn.

[21] Appl. No.: 11,432

[22] Filed: Jan. 29, 1993

[51] Int. Cl.⁵ .............................................. B23P 15/00
[52] U.S. Cl. ............................ 29/898.044; 29/898.065; 29/898.067
[58] Field of Search ................... 29/898.044, 898.065, 29/898.067; 384/523, 525, 531, 532, 537

[56] References Cited

U.S. PATENT DOCUMENTS

| 1,442,978 | 1/1923 | Shafer | 29/898.067 |
| 1,794,634 | 3/1931 | Marles | 29/898.067 |
| 1,958,025 | 5/1934 | Styri | 29/898.067 |
| 4,126,362 | 11/1978 | Hamblin et al. | 29/898.067 |
| 4,320,565 | 3/1982 | Warchol | 29/898.067 |
| 4,322,879 | 4/1982 | Warchol | 29/898.067 |
| 4,623,270 | 11/1986 | Olschewski et al. | 29/898.067 |
| 4,702,627 | 10/1987 | Pollastro | 29/898.027 |
| 4,978,237 | 12/1990 | Motohashi et al. | 384/580 |
| 5,152,062 | 10/1992 | Alling et al. | 384/523 X |

FOREIGN PATENT DOCUMENTS

| 2146056 | 3/1973 | Fed. Rep. of Germany | 29/898.067 |
| 0081892 | 11/1934 | Sweden | 29/898.067 |

*Primary Examiner*—Irene Cuda
*Attorney, Agent, or Firm*—John C. Bigler

[57] ABSTRACT

Material is first formed into a flat ring. Ball receiving pockets are formed in the flat ring leaving bridge material between adjacent pockets. Bridge material between adjacent pockets is flattened such that the bridge material spreads to meet the adjacent bearing balls, thereby locking the retainer within a ball bearing assembly. The resulting substantially flat bridge between adjacent reconfigured ball pockets is then crimped such that ends of the bridge are moved slightly toward each other and pressure of the reconfigured ball pockets against the bearing balls is reduced.

22 Claims, 2 Drawing Sheets

METHOD OF MAKING A ONE-PIECE BALL BEARING RETAINER

BACKGROUND OF THE INVENTION

This invention relates generally to ball retainers for ball bearings and, more particularly, to a one-piece ball bearing retainer with a crimped configuration providing ball retention.

Many types of prior art ball bearing retainers and cages have been used. One of the major types includes welded metal retainers where two halves are welded together. These welded two-piece retainers have fair wrap-around and conformity to the ball shape. Operating temperature is limited by the lubricant and not by the retainer. However, it is difficult to ensure 100 percent good welds with a welded two-piece retainer design.

Riveted two-piece metal retainers are similar to welded two-piece metal retainers except the two halves are riveted together rather than welded. That type retainer requires many small rivets that are difficult to insert. Visual inspection is more accurate than with welded retainers; however, poor riveting may occur. Similarly, mechanically interlocked retainers also require two halves and may be difficult to fasten together.

Spring finger-type retainers offer a one-piece design but are difficult to make with sufficient ball contacting surface or wrap-around. Spring finger-type retainers usually require special heat treating. Polymer retainers offer one-piece design and have good wrap-around and ball conformity. However, polymer retainers are generally limited to lower temperature and low strength applications.

One proposed metal retainer is formed as one-piece by fashioning a sheet metal ring into an undulatory form with open ball pockets spaced apart by U-shaped connecting portions. After balls are placed into the pockets, the U-shaped connecting portions are upset, causing the sides of the U-shaped connecting portions to spread and partially conform to the contour of the balls. However, that proposed design fails to provide sufficient ball retention without gripping the balls to tightly.

The foregoing illustrates limitations known to exist in present ball bearing retainers. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a method for making retainers or cages for ball bearings. Material is first formed into a ring, and ball receiving pockets are formed in the ring leaving bridge material between adjacent ball receiving pockets. Bearing balls are inserted into the ball receiving pockets and bridge material between adjacent pockets is flattened such that the bridge material spreads to meet the adjacent bearing balls, thereby retaining the bearing balls within reconfigured ball pockets having a depth greater than one-half the diameter of the bearing balls. The resulting substantially flat bridge between adjacent reconfigured ball pockets is then crimped such that ends of the bridge are moved slightly toward each other and pressure of the reconfigured ball pockets against the bearing balls is reduced.

The foregoing and other aspects will become apparent from the following detailed description of the invention when considered in conjunction with the accompanying drawing figures.

BRIEF DESCRIPTION OF THE DRAWING FIGURES

In this specification, identical elements in different embodiments are given identical reference characters.

DETAILED DESCRIPTION

Figure 1:
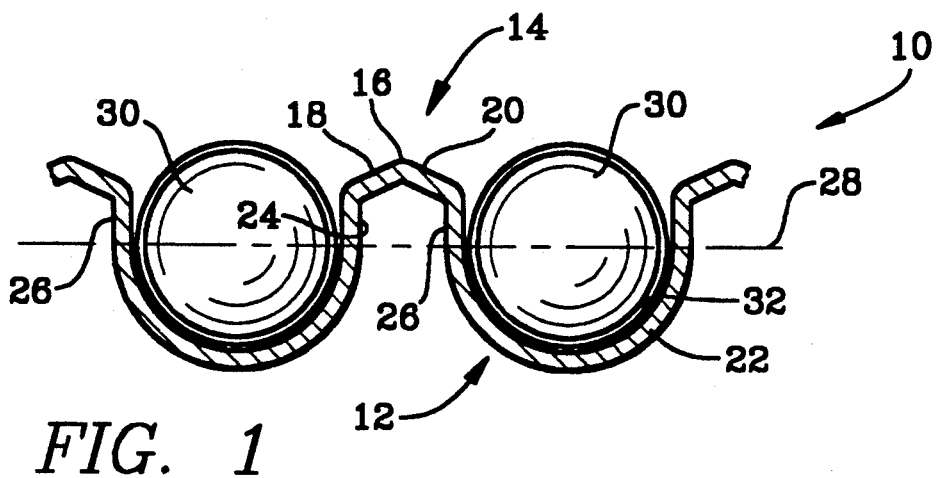
FIG. 1 is a cross-sectional view illustrating a portion of a partially formed first embodiment of one-piece ball bearing retainer of the present invention.

Referring now to the drawings, FIG. 1 illustrates a portion of a partially formed one-piece ball bearing retainer 10 of the present invention. Ball bearing retainer 10 is used to retain balls of an antifriction bearing as described below.

To form ball bearing retainer 10, metal is first formed into the shape of a flat ring, using any known forming method. In one such method, the ring is punched as a "washer" from a wide strip or sheet of flat metal. In another method, the flat ring is formed from a narrow flat strip of metal which is coiled edge-wise ("the hard way") into a split ring. The ends of the split ring may be left unjoined or may be welded or mechanically linked by a puzzle-like cut or other means to form a continuous band. Overlapping ends, for example, may be joined by a lap weld, coined to an even thickness, and trimmed to size.

Next, multiple ball receiving pockets 12 are pressed into the flat ring. When ball receiving pockets 12 are formed, bridge material 14 is left between adjacent ball receiving pockets 12. In the preferred embodiment of FIG. 1, bridge material 14 is formed into an initial "tent" shape, having a peak 16 and sloping side portions 18 and 20. This "tent" shape facilitates the subsequent forming steps, described below. However, other initial shapes of bridge material 14 can be used in the present invention with similar effect.

Ball receiving pockets 12 have a rounded bottom portion 22 and parallel straight side portions 24 and 26, extending above the centerline 28 of bearing balls 30 to be positioned within ball receiving pockets. Parallel, straight side portions 24 and 26 join sloping side portions 18 and 20, respectively. Thus, ball receiving pockets 12 have a depth greater than one-half the diameter of bearing balls 30. Spherically concave ball seats 32 may be pressed into the flat ring, either concurrently with the forming of ball receiving pockets 12 or as a separate, subsequent step, to achieve the same basic cross-section as two-piece retainers.

During the forming of ball receiving pockets 12, material of the ring is gathered together, thereby reducing the diameter of the ring to the desired pitch diameter of bearing balls 30. Significantly, sloping side portions 18 and 20 of bridge material 14 and straight side portions 24 and 26 of ball receiving pockets 12 provide an open pocket without side relief, thereby facilitating release of ball bearing retainer 10 from the forming tooling. Rounded bottom portion 22 of ball receiving pockets 12 has a diameter slightly greater than that of bearing balls 30 to provide a clearance fit.

An alternative method for forming ball bearing retainer 10 is to coil a flat strip of metal edge-wise ("the hard way") and cut off more than a 360 degree arc, or length. The length is selected such that progressive forming of ball receiving pockets 12 absorbs the arc in excess of 360 degrees. As a result, after final forming, the ends of the coiled flat strip just meet and are available for welding or mechanical forming, if desired. Or, the ends may overlap slightly at final forming to permit lap welding, coining and trimming, as stated above.

Figure 2:
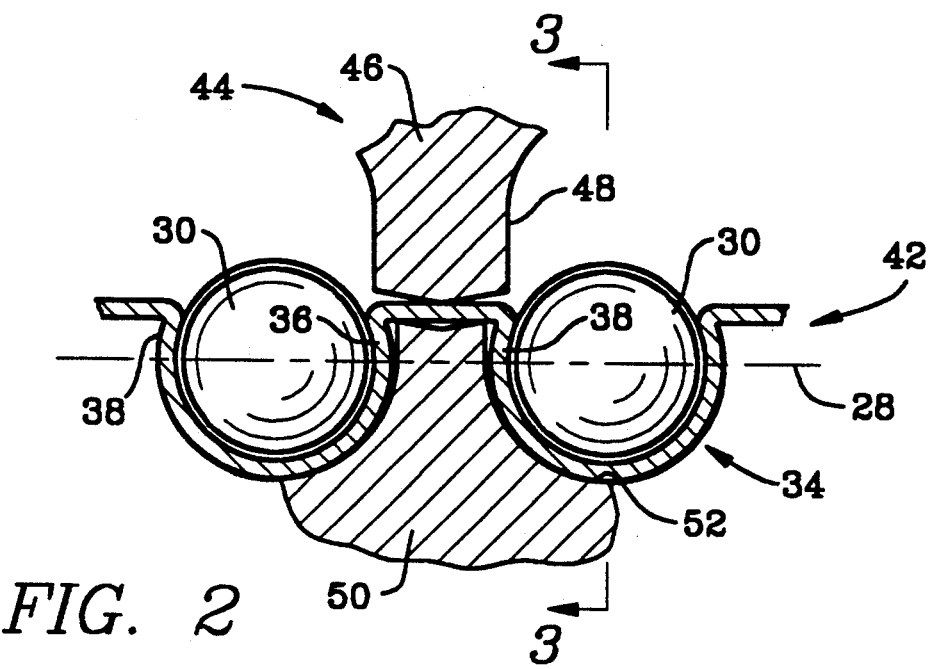
FIGS. 2 and 3 are cross-sectional views illustrating an intermediate step in the forming of the one-piece ball bearing retainer embodiment of FIG. 1 and, in addition, illustrating tooling that may be used to partially form the retainer.
Figure 3:
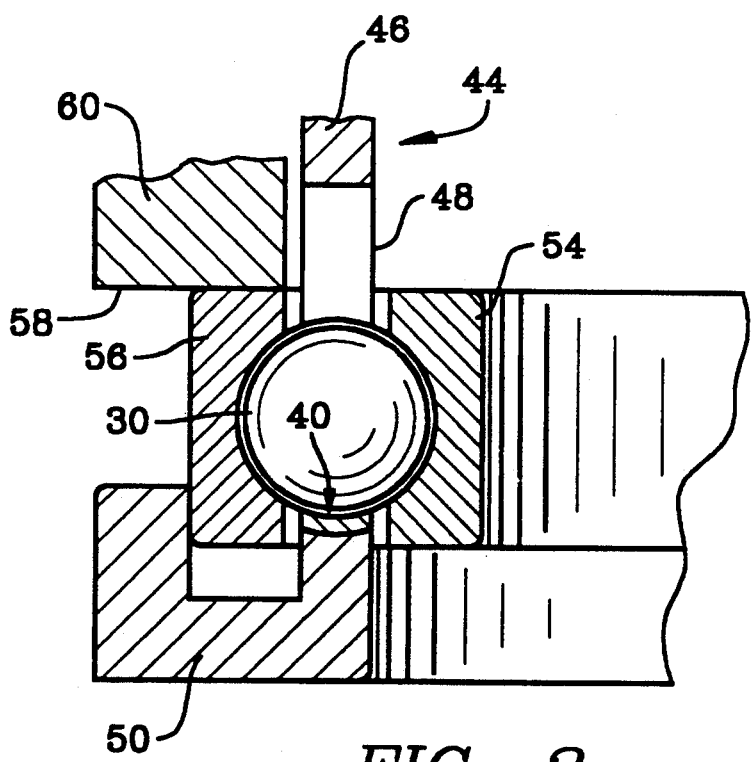

FIGS. 2 and 3 illustrate a subsequent step in which bridge material 14 is pressed downward and spreads circumferentially to meet adjacent bearing balls 30, thereby retaining bearing balls 30 within reconfigured ball pockets 34. Dimensions of bridge material 14 are selected such that straight side portions 24 and 26 conform to bearing balls 30 as arcuate portions 36 and 38, respectively. Reconfigured ball pockets 34 have a depth greater than one-half the diameter of bearing balls 30 such that arcuate portions 36 and 38 partially close the pockets; that is, the chordal length of the opening is smaller than the diameter of the balls to provide ball retention.

The reshaping of partially formed ball bearing retainer 10 is indicated as reconfigured ball retainer 40, having a substantially flat bridge 42 between adjacent reconfigured ball pockets 34. Due to the spreading of bridge material 14 against bearing balls 30, reconfigured ball pockets 34 initially provide a tight fit with bearing balls 30. Depending upon the resiliency of the material used, some clearance may result from "spring back" of reconfigured ball retainer 40 after it is removed from the tooling, thereby facilitating desired rotation of bearing balls 30.

FIGS. 2 and 3 are cross-sectional front and side views illustrating forming press 44 which may be used to press bridge material 14 so as to form substantially flat bridge 42. Upper portion 46 of a die set includes fingers 48 which mate with lower portion 50 of the die set to form substantially flat bridge 42, as described below. Lower portion 50 may include spherically concave recesses 52 for receiving ball seats 32 and bearing balls 30.

As illustrated in FIG. 3, forming of reconfigured ball retainer 40 may be done after bearing balls 30 are positioned between inner and outer bearing races 54 and 56, respectively, and ball bearing retainer 10 is inserted. The "tent" shape of bridge material 14 facilitates guiding of bearing balls 30 into ball receiving pockets 12, and rounded bottom portion 22 provides final circumferential spacing of bearing balls 30. Flattening of bridge material 14 to form substantially flat bridge 42 provides a unique locking effect to prevent removal of reconfigured ball retainer 40 from the resulting bearing assembly.

Preferably, support is provided during the flattening of bridge material 14 to prevent the retainer from skidding radially outwardly. Without such support, the pitch diameter of the retainer would tend to increase. For example, as shown in FIG. 3, the retainer may be forced against bearing balls 30 by clamping between lower portion 50 of the die set and stop surface 58 of fixture 60. Bearing balls 30 are retained radially by outer race 56, thereby preventing an undesired increase of pitch diameter of reconfigured ball retainer 40 during forming.

However, it is not necessary to position one-piece retainer 10 between bearing races when producing reconfigured ball retainer 40, provided the retainer is sufficiently restrained against radially outward movement. The present invention may also be employed to produce a subassembly with only the bearing retainer and bearing balls. Such a bearing retainer, which retains the bearing balls in all directions without aid of bearing races, is referred to herein as a bearing "cage".

Figure 4:
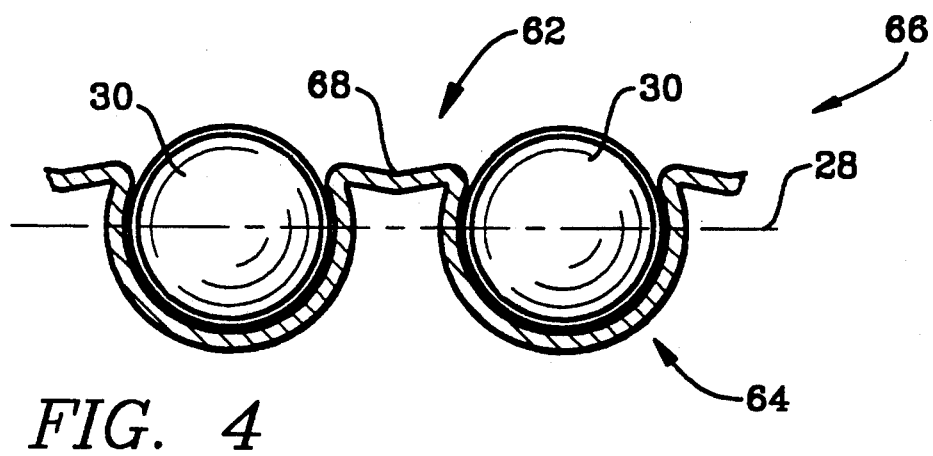
FIG. 4 is a cross-sectional view illustrating a portion of the completed one-piece ball bearing retainer embodiment of FIG. 1.

In order to ensure that sufficient clearance is provided between ball pockets and bearing balls 30, substantially flat bridge 42 is reconfigured as "crimped" bridge 62, as shown in FIG. 4. This crimping operation results in slight "overbending", either upward or downward, to move ends of substantially flat bridge 42 slightly closer together, drawing reconfigured ball pockets 34 back slightly from bearing balls 30. A clearance fit is thus provided between the balls and completed ball pockets 64 of completed ball retainer 66.

Crimped bridge 62 may have a V-shape with central crease 68, or may have other shapes resulting in the desired foreshortening. The crimping tooling ma be separate from the tooling used to form substantially flat bridge 42. Alternatively, flattening and crimping may be accomplished by a single set of tooling, for example, that of FIG. 2. Upper and lower portions 46 and 50 of the die set have wedge and concave configurations, respectively, which first provide flattening (FIG. 2) and, upon further closing of the die set, provide crimping to form crimped retainer 66 (FIG. 4).

Figure 5:
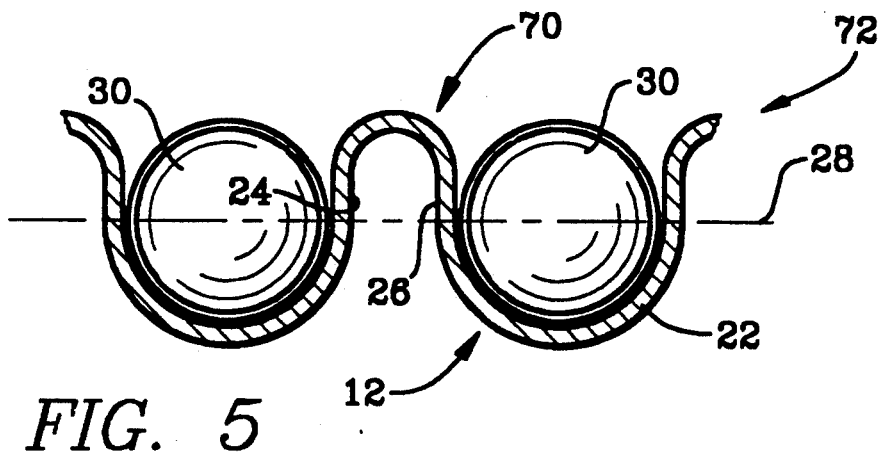
FIG. 5 is a cross-sectional view illustrating a portion of a partially formed second embodiment of one-piece ball bearing retainer of the present invention.

The ball bearing retainer of the present invention is preferably made of steel or brass, depending upon the desired application, although other materials could also be used. Notches or other weakening of bridge material 14 may be employed to facilitate desired bending at peak 16 and/or at the juncture between sloping side portions 18, 20 and straight side portions 24, 26. Bridge material 14 may have other shapes in addition to the "tent" shape of FIG. 1; for example, arched bridge 70 of partially formed ball bearing retainer 72 may be used, as shown in FIG. 5.

The present invention allows visual inspection of a bearing assembly or bearing cage to determine if bearing balls 30 are properly secured. Crimped bridge 62 is easily visible, even when installed between inner and outer bearing races 54 and 56. The assembled bearing has annular openings between the bearing races after the bearing assembly is removed from forming press 44, as is apparent from FIG. 3. In contrast, welds and rivets of prior art two-piece bearing retainers are not easily inspected for proper fastening.

The present invention may also be employed to form a separate retainer or cage to be snapped over bearing balls when the separate retainer or cage is installed in a bearing assembly. This separate retainer or cage may be formed about a first set of bearing balls, as described above, and those bearing balls would later be removed as a final step in forming the separate retainer or cage. To facilitate removal of this first set of bearing balls, those "bearing balls" may be only portions of spheres and may be integrated in tooling that rotates them for removal.

From the above, it will be apparent that the present invention provides a low cost method of making a ball bearing retainer that has good wrap-around and ball conformity in combination with high temperature limits. Because the resulting retainer is a one-piece design, manufacturing costs and assembly problems relating to assembling two halves together are eliminated. Also, the present invention provides a method of making a bearing cage with similar features suitable for use as a subassembly for insertion in ball bearing assemblies.

Having described the invention, What is claimed is:

1. A method of producing a ball bearing retainer or bearing cage, the method comprising the steps of:
   forming material into a ring;
   pressing the ring, thereby forming ball receiving pockets in the ring and leaving bridge material between adjacent pockets;
   inserting a bearing ball into each ball receiving pocket;
   flattening the bridge material between adjacent ball receiving pockets such that the bridge material spreads to meet the adjacent bearing balls, thereby retaining the bearing balls within reconfigured ball pockets, the reconfigured ball pockets having a depth greater than one-half the diameter of the bearing balls, the bridge material forming a substantially flat bridge between adjacent reconfigured ball pockets; and
   crimping the substantially flat bridge between adjacent reconfigured ball pockets such that ends of said bridge are moved slightly toward each other and pressure of the reconfigured ball pockets against the bearing balls is reduced.

2. The method according to claim 1, wherein the pressing of the ring forms the ball receiving pockets with a rounded bottom portion and parallel straight side portions, the parallel straight side portions extending above the centerline of the bearing balls.

3. The method according to claim 1, further comprising the step of pressing the ball receiving pockets, thereby forming ball seats with spherical surfaces.

4. The method according claim 1, further comprising the step of positioning the ring, with the ball receiving pockets formed therein, between inner and outer bearing races before the step of flattening the bridge material to retain the bearing balls within reconfigured ball pockets.

5. The method according to claim 1, wherein the bridge material between adjacent pockets initially has a "tent" shape.

6. The method according to claim 1, wherein the bridge material between adjacent pockets initially has an arch shape.

7. The method according to claim 1, wherein the crimping of the substantially flat bridge between adjacent reconfigured ball pockets is a slight overbending past the flat condition to an inverted "tent" or arch shape.

8. The method according to claim 1, wherein the step of forming material into a ring comprises coiling a narrow strip of metal edge-wise and joining ends to form a flat washer-like ring.

9. The method according to claim 1, wherein the step of pressing the ring to form ball pockets in the ring results in reducing the diameter of the ring to match a desired pitch diameter of the bearing balls.

10. The method according to claim 1, wherein the step of forming material into a ring comprises coiling a narrow strip of metal edge-wise and cutting the coiled narrow strip to provide overlapping ends, and wherein the step of pressing the ring to form ball pockets comprises progressive forming such that the overlapping of the ends is reduced.

11. The method according to claim 1, further comprising the step of removing the bearing balls to provide a separate retainer or cage.

12. A method of producing a ball bearing assembly, the method comprising the steps of:
   forming material into a ring;
   pressing the ring, thereby forming ball receiving pockets in the ring and leaving bridge material between adjacent pockets, the resulting structure being a partially formed bearing retainer;
   positioning a plurality of bearing balls within an annular space between an outer bearing race and an inner bearing race;
   inserting the partially formed bearing retainer within the annular space between the outer bearing race and the inner bearing race such that a bearing ball is received in each ball receiving pocket;
   flattening the bridge material between adjacent ball receiving pockets such that the bridge material spreads to meet the adjacent bearing balls, thereby locking the partially formed bearing retainer to the bearing balls, the bearing balls being retained within reconfigured ball pockets, the reconfigured ball pockets having a depth greater than one-half the diameter of the bearing balls, the bridge material forming a substantially flat bridge between adjacent reconfigured ball pockets; and
   crimping the substantially flat bridge between adjacent reconfigured ball pockets such that ends of said bridge are moved slightly toward each other and pressure of the reconfigured ball pockets against the bearing balls is reduced.

13. The method according to claim 12, wherein the step of inserting the partially formed bearing retainer within the annular space between the outer bearing race and the inner bearing race provides a desired final spacing of the bearing balls.

14. The method according to claim 13, wherein the step of flattening the ridge material between adjacent ball receiving pockets comprises pressing the partially formed bearing retainer against the bearing balls, the bearing balls being restrained by at least one of the inner bearing race and the outer bearing race, such that radially outward movement of the partially formed bearing retainer is limited during the flattening step.

15. The method according to claim 12, wherein the pressing of the ring forms the ball receiving pockets with a rounded bottom portion and parallel straight side portions, the parallel straight side portions extending above the centerline of the bearing balls.

16. The method according to claim 12, further comprising the step of pressing the ball receiving pockets, thereby forming ball seats with spherical surfaces.

17. The method according to claim 12, wherein the bridge material between adjacent pockets initially has a "tent" shape.

18. The method according to claim 12, wherein the bridge material between adjacent pockets initially has an arch shape.

19. The method according to claim 12, wherein the crimping of the substantially flat bridge between adjacent reconfigured ball pockets is a slight overbending past the flat condition to an inverted "tent" or arch shape.

20. The method according to claim 12, wherein the step of forming material into a ring comprises coiling a narrow strip of metal edge-wise and joining ends to form a flat washer-like ring.

21. The method according to claim 12, wherein the step of pressing the ring to form ball pockets in the ring results in reducing the diameter of the ring to match a desired pitch diameter of the bearing balls.

22. The method according to claim 12, wherein the step of forming material into a ring comprises coiling a narrow strip of metal edge-wise and cutting the coiled narrow strip to provide overlapping ends, and wherein the step of pressing the ring to form ball pockets comprises progressive forming such that the overlapping of the ends is reduced.

* * * * *